(12) United States Patent
Martikainen (10) Patent No.: US 12,229,896 B2
(45) Date of Patent: Feb. 18, 2025

(54) MODELLING OF UNDERGROUND WORKSITE

(71) Applicant: SANDVIK MINING AND CONSTRUCTION OY, Tampere (FI)

(72) Inventor: Pekka Martikainen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 74 days.

(21) Appl. No.: 17/761,362

(22) PCT Filed: Sep. 17, 2020

(86) PCT No.: PCT/EP2020/076041
§ 371 (c)(1),
(2) Date: Mar. 17, 2022

(87) PCT Pub. No.: WO2021/053112
PCT Pub. Date: Mar. 25, 2021

(65) Prior Publication Data
US 2022/0292782 A1   Sep. 15, 2022

(30) Foreign Application Priority Data
Sep. 20, 2019   (EP) .................................... 19198780

(51) Int. Cl.
*G06T 19/00*   (2011.01)
*G01C 21/34*   (2006.01)
*G06T 17/05*   (2011.01)

(52) U.S. Cl.
CPC ........ *G06T 19/003* (2013.01); *G01C 21/3407* (2013.01); *G06T 17/05* (2013.01)

(58) Field of Classification Search
CPC .... G06T 19/003; G06T 17/05; G01C 21/3407
See application file for complete search history.

(56) References Cited

U.S. PATENT DOCUMENTS

| 9,797,247 B1 | 10/2017 | Nelson et al. |
| 2003/0108145 A1* | 6/2003 | Knoplioch ............ G06T 19/003 378/4 |

(Continued)

FOREIGN PATENT DOCUMENTS

| WO | 2007026112 A2 | 3/2007 |
| WO | 2015106799 A1 | 7/2015 |

OTHER PUBLICATIONS

Bakambu, Joseph Nsasi, and Vladimir Polotski. "Autonomous system for navigation and surveying in underground mines." Journal of Field Robotics 24.10 (2007): 829-847 (Year: 2007).*

(Continued)

*Primary Examiner* — William A Beutel
(74) *Attorney, Agent, or Firm* — Corinne R. Gorski (57) ABSTRACT

A method includes the steps of receiving a three-dimensional input model of an underground tunnel system of a worksite, determining an initial first location in the input model for a virtual probe, determining distances between the first location and tunnel walls on the basis of the input model; determining tunnel heading on the basis of processing the determined distances, relocating the virtual probe at a second location in the input model along with the determined tunnel heading, and generating a logical tunnel model indicative of path of the virtual probe travelling in the input model, on the basis of determined locations of the virtual probe being relocated in the input model.

13 Claims, 6 Drawing Sheets

(56) References Cited

U.S. PATENT DOCUMENTS

2005/0110791 A1\* 5/2005 Krishnamoorthy ..... G06T 7/149
 345/419
2007/0052724 A1\* 3/2007 Graham ................ G06T 19/003
 345/620

OTHER PUBLICATIONS

Mishra, Swati, and Pankaj Bande. "Maze solving algorithms for micro mouse." 2008 IEEE International Conference on Signal Image Technology and Internet Based Systems. IEEE, 2008 (Year: 2008).\*
Ferreira, António Bernardo, José Miguel Almeida, and Eduardo Silva. "Application of visual-inertial slam for 3D mapping of underground environments." IROS 2012-IEEE/RSJ International Conference on Intelligent Robots and Systems. 2012 (Year: 2012).\*
Kim In-Seok et al: "Simple Global Path Planning Algorithm Using a Ray-Casting and Tracking Method". Journal of Intelligent and Robotic Systems, Kluwer Dordrecht, NL, vol. 90, No. 1, Sep. 20, 2017, pp. 101-111.

\* cited by examiner

MODELLING OF UNDERGROUND WORKSITE

RELATED APPLICATION DATA

This application is a § 371 National Stage Application of PCT International Application No. PCT/EP2020/076041 filed Sep. 17, 2020 claiming priority to EP 19198780.9 filed Sep. 20, 2019.

FIELD

The present invention relates to modelling of an underground worksite.

BACKGROUND

Underground worksites, such as hard rock or soft rock mines, typically comprise a variety of operation zones intended to be accessed by different types of mobile work machines, herein referred to as mobile vehicles. An underground mobile vehicle may be an unmanned, e.g. remotely controlled from a control room, or a manned mobile vehicle, i.e. operated by an operator sitting in a cabin of the mobile vehicle. Mobile vehicles operating in underground work sites may be autonomously operating, i.e. automated or semi-automated mobile vehicles, which in their normal operating mode operate independently without external control but which may be taken under external control at certain operation areas or conditions, such as during states of emergencies. Location tracking of mobile objects, such as mobile vehicles and persons is required at many worksites.

WO2015106799 discloses a system for scanning surroundings of a vehicle for producing data to determining position and orientation of the vehicle. The vehicle is provided with a reference point cloud data of the mine. The control unit is configured to match second point cloud data produced by a scanning device of the vehicle to the reference point cloud data in order to determine position data of the vehicle. 3D models may be required also for other applications, such as visualization and location based analytics. 3D models of underground tunnel systems may be design models, generated by underground system design software, for example.

U.S. Pat. No. 9,797,247 relates to a control system for a machine configured to scan walls of a mine and discloses using a mine map illustrating a section of a mine, the mine map including one or vehicle routes and mine walls. In response to user inputs, a virtual wall and a temporary wall may be added to the mine map. Operation of the machine is controlled based on the mine map to avoid collision to the walls in the mine map.

SUMMARY

According to a first aspect of the present invention, there is provided an apparatus, comprising means configured for performing: receiving a three-dimensional input model of an underground tunnel system of a worksite, determining an initial first location in the input model for a virtual probe, determining distances between the first location and tunnel walls on the basis of the input model, determining tunnel heading on the basis of processing the determined distances, relocating the virtual probe at a second location in the input model along with the determined tunnel heading, generating a logical tunnel model indicative of path of the virtual probe travelling in the input model, on the basis of determined locations of the virtual probe being relocated in the input model, and applying the logical tunnel model to determine a route between a start point and an end point for a vehicle in the tunnel system.

The means may comprise at least one processor; and at least one memory including computer program code, the at least one memory and computer program code configured to, with the at least one processor, cause the performance of the apparatus.

According to a second aspect of the present invention, there is provided a method for modelling a underground tunnel system, comprising: receiving a three-dimensional input model of an underground tunnel system of a worksite, determining an initial first location in the input model for a virtual probe, determining distances between the first location and tunnel walls on the basis of the input model, determining tunnel heading on the basis of processing the determined distances, relocating the virtual probe at a second location in the input model along with the determined tunnel heading, generating a logical tunnel model indicative of path of the virtual probe travelling in the input model, on the basis of determined locations of the virtual probe being relocated in the input model, and applying the logical tunnel model to determine a route between a start point and an end point for a vehicle in the tunnel system.

According to a third aspect, there is provided an apparatus comprising at least one processing core, at least one memory including computer program code, the at least one memory and the computer program code being configured to, with the at least one processing core, cause the apparatus at least to carry out the method or an embodiment of the method.

In an embodiment according to any of the aspects, the virtual probe is relocated in a virtual tunnel based on the input model without collision to an obstacle defined in the input model.

In an embodiment according to any of the aspects, a set of rays is cast from the first location in multiple directions, determine the distances on the basis of measuring distance to a ray intersection point for each ray, and the tunnel heading is determined on the basis of comparing the distances.

In an embodiment according to any of the aspects, the apparatus is a server or comprised in a control system further configured to visualize the logical tunnel model on at least one display device.

BRIEF DESCRIPTION OF THE DRAWINGS

FIG. 4 illustrates a method according to at least some embodiments;

EMBODIMENTS

Figure 1:
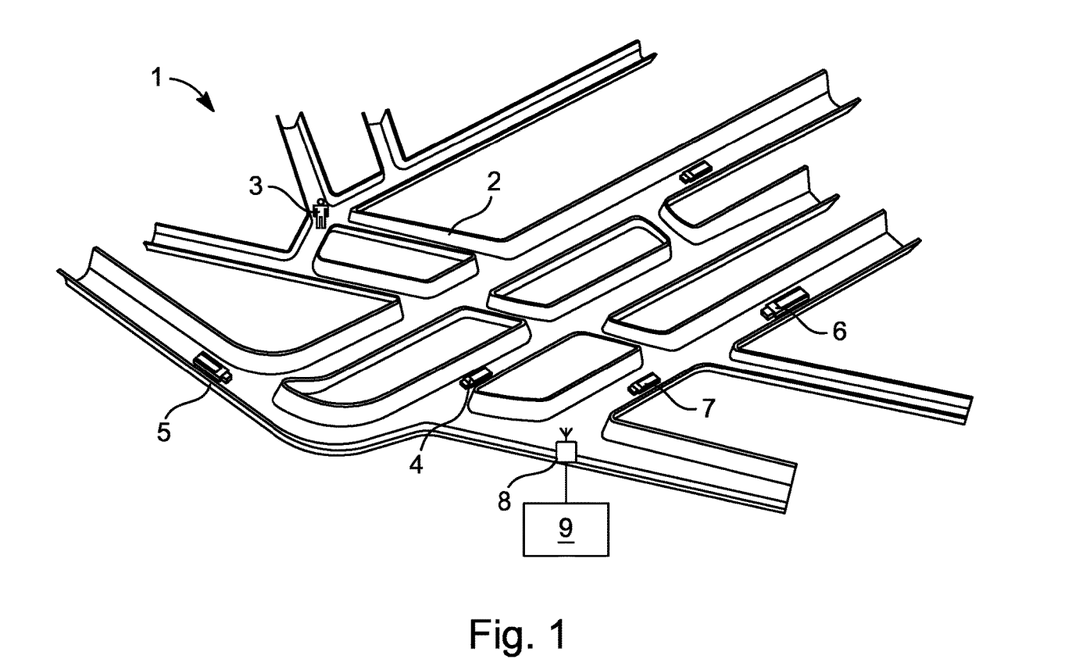
FIG. 1 illustrates an example of an underground work site.

FIG. 1 illustrates a simplified example of an underground mine comprising a network 2 of underground tunnels. A plurality of mobile objects or devices, such as persons or pedestrians 3 and/or mine vehicles 4, 5, 6, 7 may be present in and move between different areas or operation zones of the worksite 1.

The term vehicle herein refers generally to mobile work machines suitable to be used in the operation of different kinds of mining and/or construction excavation worksites, such as lorries, dumpers, vans, mobile rock drilling or milling rigs, mobile reinforcement machines, bucket loaders or other kind of mobile work machines which may be used in different kinds of surface and/or underground excavation worksites. Hence, the term mine vehicle is not limited in any way to vehicles only for ore mines, but the mine vehicle may be a mobile work machine used at excavation sites. A mine vehicle may be an autonomously operating mobile vehicle. The term autonomously operating mobile vehicle herein refers to automated or semi-automated mobile vehicles, which in their autonomous operating mode may operate/drive independently without requiring continuous user control but which may be taken under external control during states of emergencies, for example.

The worksite 1 comprises a communications system, such as a wireless access system comprising a wireless local area network (WLAN) and/or a cellular communications network, comprising a plurality of wireless access nodes 8. The access nodes 8 may communicate with wireless communications units comprised by the mine vehicles or mobile devices carried by pedestrians and with further communications devices (not shown), such as network device(s) configured to facilitate communications with a control system 9, which may be an on-site (underground or above-ground) and/or remote via intermediate networks. For example, a server of the system 9 may be configured to manage at least some operations at the worksite, such as provide a UI for an operator to remotely monitor and, when needed, control automatic operation operations of the mine vehicles and/or assign work tasks for a fleet of vehicles and update and/or monitor task performance and status.

The system 9 may be connected to a further network(s) and system(s), such a worksite management system, a cloud service, an intermediate communications network, such as the internet, etc. The system may comprise or be connected to further device(s) or control unit(s), such as a handheld user unit, a vehicle unit, a worksite management device/system, a remote control and/or monitoring device/system, data analytics device/system, sensor system/device, etc.

The worksite 1 may further comprise various other types of mine operations devices 10 connectable to the control system 9 e.g. via the access node 8, not in detail illustrated in FIG. 1. Examples of such further mine operations devices 10 include various devices for power supply, ventilation, air condition analysis, safety, communications, and other automation devices. For example, the worksite may comprise a passage control system comprising passage control units (PCU) 11 separating operation zones, some of which may be set-up for autonomously operating mine vehicles. The passage control system and associated PCUs may be configured to allow or prevent movement of one or more mine vehicles and/or pedestrians between zones.

Figure 2A:
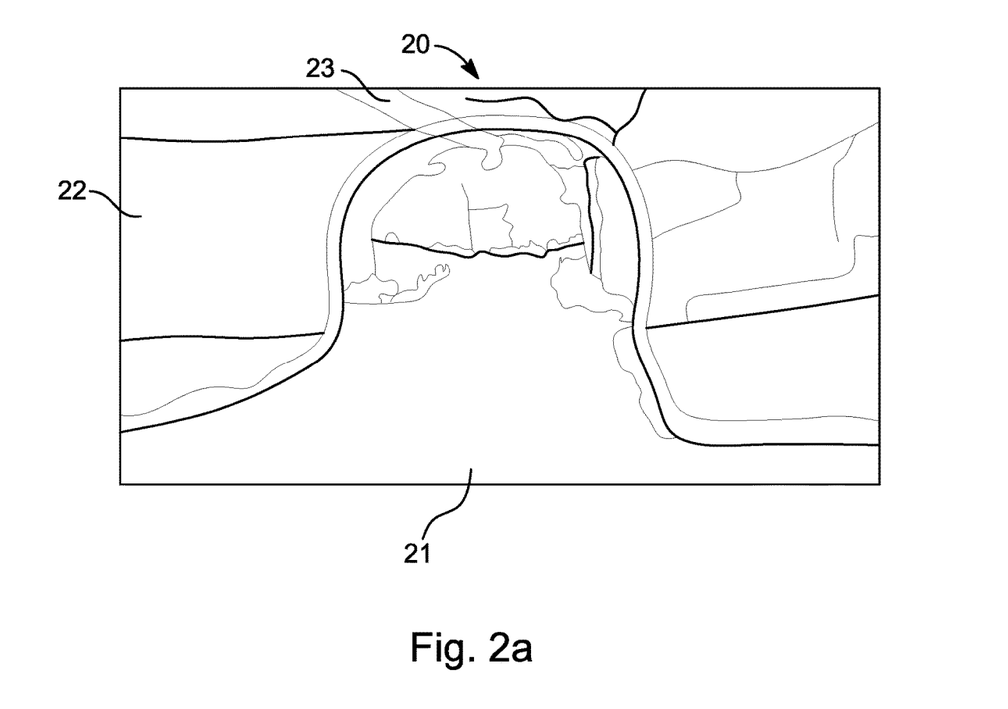
FIGS. 2a and 2c illustrate 3D models of an underground worksite and FIG. 2b illustrates a mesh for a mesh model.

A 3D model of the underground tunnel system may be applied for one or more applications, such as a mine visualization application, operations monitoring application, and/or a positing application. Such 3D model may also be referred to as an environment model or a tunnel model. FIG. 2a illustrates an example of a 3D model 20 of an underground worksite portion and tunnel thereof, illustrating floor 21, walls 22, and roof 23 of the tunnel. The 3D model may comprise or be formed based on point cloud data generated on the basis of the scanning.

Figure 2B:
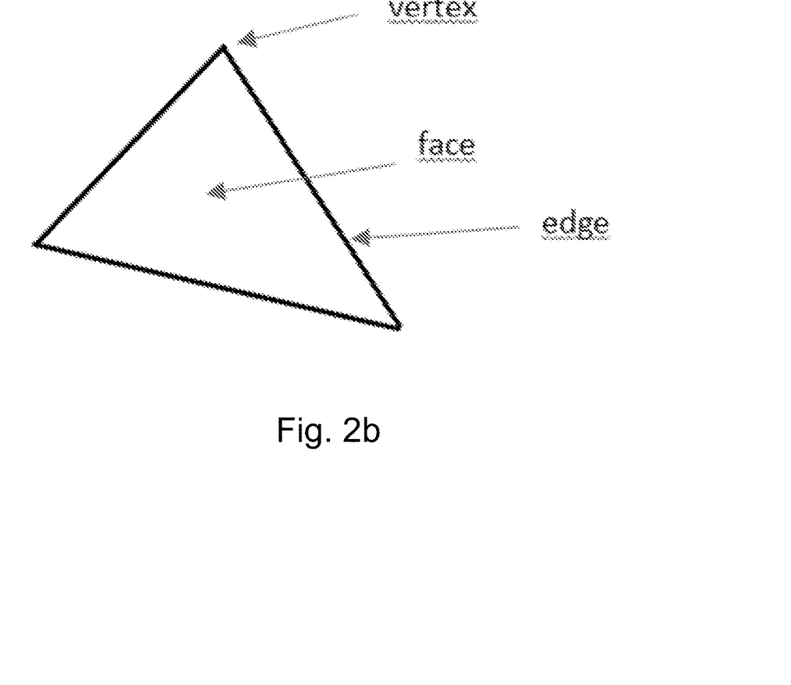
Figure 2C:
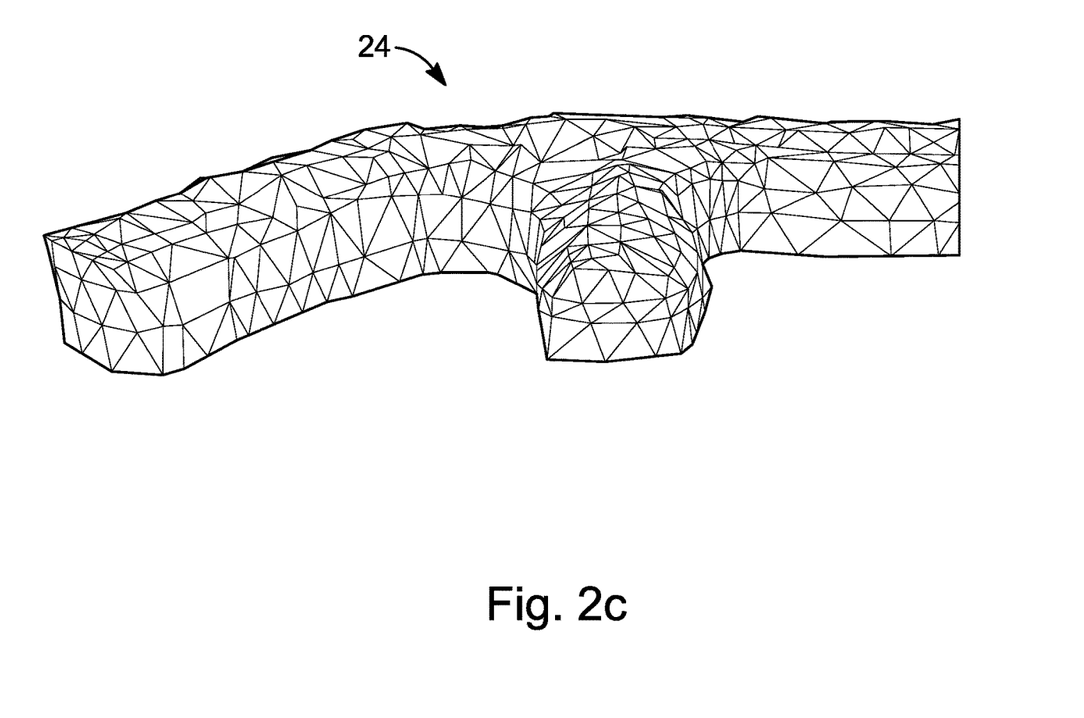

In some embodiments, with reference to FIGS. 2b and 2c, the 3D model is a mesh model 24 comprising vertices, edges and faces.

In other embodiments, the 3D model may be a design model or may be generated on the basis of a design model, such as a CAD model, created by a mine designing software or a 3D model created on the basis of tunnel lines and profiles designed in a drill and blast design software. Thus, same analysis or processing can be done on measured or initial planned model of the tunnel environment.

The 3D model may be stored in a database accessible by one or more modules of a computing apparatus, such as a mine model processing module, a user interface or visualizer module, a route planning module, and/or a positioning service module.

Mesh models may be converted into mathematical graphs using algorithms, which approximate the mesh geometry to create a simpler model. However, these methods often do not provide satisfactory results for underground mine representation purposes. Underground worksite models are typically large and consist of several source files and worksite model portions, which do not always seamlessly connect to each other. Thus, the model may be 'broken' by a tunnel end section of one model portion not matching with tunnel start section of another model portion. Mathematical algorithms have difficulties with connecting such model portions together. Worksites typically also have special tunnels shapes, for example, passing bays, which are wider tunnel sections. Algorithms may have difficulties to detect these kinds of special shapes.

Figure 3:
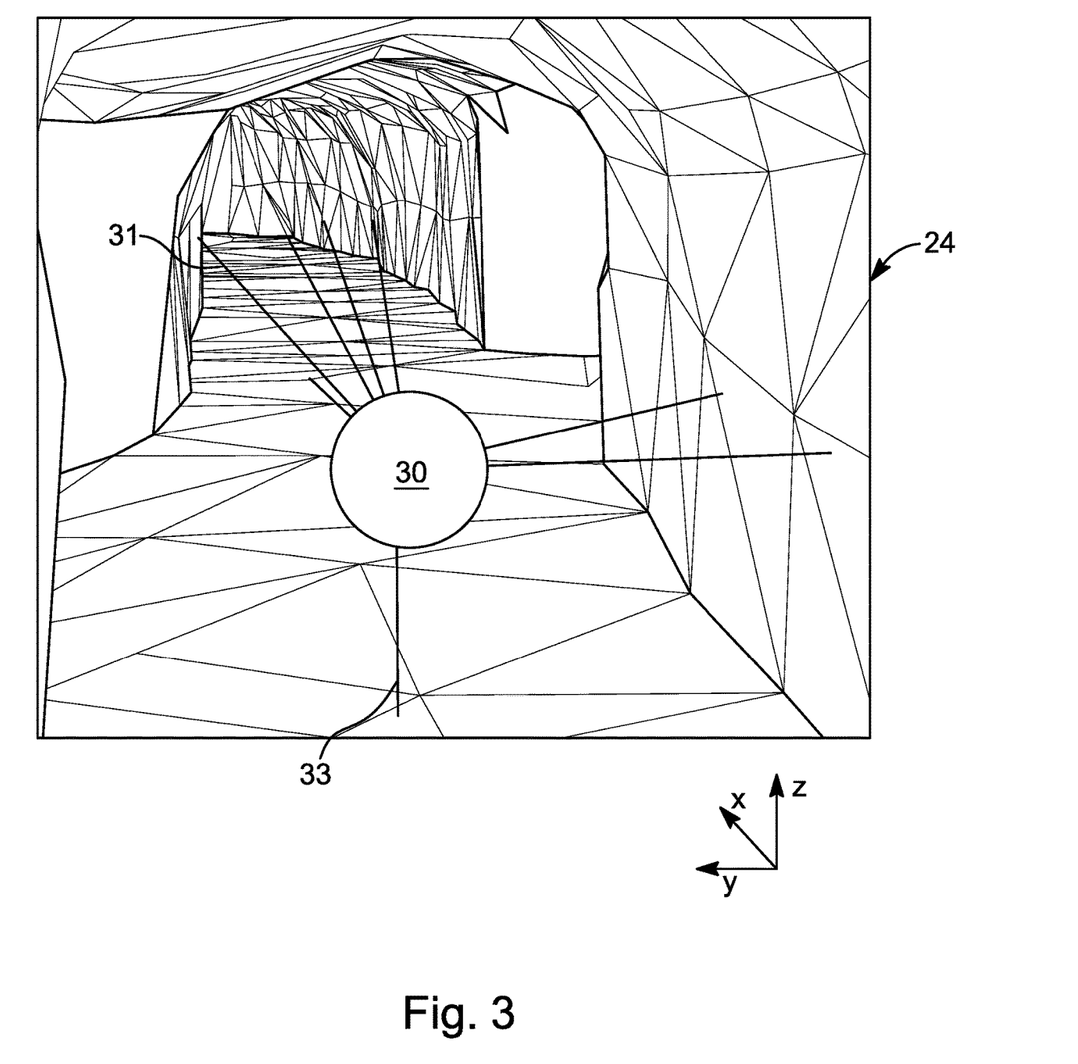
FIG. 3 illustrates a virtual probe according to at least some embodiments.

There is now provided an improved method and system for underground worksite model processing, enabling to generate a seamless logical tunnel model based on a predefined 3D (input) model, which may comprise a plurality of non-completely matching portions. With reference to FIG. 3, a virtual vehicle or probe 30 is generated to travel inside the virtual 3D tunnel system defined by 3D input model. The virtual probe 30 may be a software entity and is configured to analyse the 3D input model, e.g. a mesh model 24. On the basis of a moving the virtual probe 30 in the virtual tunnel system, the system or procedure generates a logical tunnel model indicative of the path that the virtual probe has travelled in the model.

Thus, instead of using mathematical algorithms approximating the model, the virtual probe is 'sent' to the 'virtual mine', which is modeled as a 3D mesh or a point cloud model. The virtual probe navigates throughout the virtual mine and maps it at the same time. The virtual probe (or vehicle) may navigate in the 3D mine model by using the same principle as many real-life autonomous vehicles, using obstacle detection. With obstacle detection, the virtual probe can avoid collisions with the tunnel walls, detect the floor and find out the tunnel heading.

FIG. 4 illustrates a method for generating a model indicative of an underground worksite and applicable as an input for controlling operations at the worksite. The method may be implemented by an apparatus configured for processing a model for an underground worksite, such as a server, a worksite operator, designer, or controller workstation, a mobile unit, a vehicle on-board control device, or other kind of appropriately configured data processing device. The apparatus may be configured to perform a model generation algorithm which may carry out a model processing or generation procedure.

A 3D input model of an underground tunnel system of a worksite, such as a mesh or point cloud 3D model as illustrated above, is received 410. The input model may be received from a database or a memory connected or comprised by the apparatus or from another device over a communication connection, for example.

An initial first location in the model is determined 420 for a virtual probe, such as the probe 30. The initial location may be predetermined starting point, randomly selected position within the tunnel system, or based on a user input from a user interface, for example.

Distances between the first location and tunnel walls are determined 430 on the basis of the input model. Tunnel heading is determined 440 on the basis of processing the determined distances.

The virtual probe is relocated 450 at a second location in the input model along with the determined tunnel heading. An obstacle detection function may be configured to relocate the virtual probe in a virtual tunnel based on the input model without collision to an obstacle, such as a wall, roof, floor, or other type of obstacle (e.g. large rock) defined in the input model. Block 450 (and 430, 440) may be part of the obstacle detection function and/or there may be further operations by the obstacle detection function, some example embodiments being illustrated below.

A logical tunnel model indicative of path of the virtual probe travelling in the input model is generated 460 on the basis of determined locations of the virtual probe being relocated in the input model. Thus, consecutive locations form a path of the virtual probe in the input 3D model.

The term 'logical tunnel model' herein generally refers to a model indicative of the tunnel structure of the input 3D model in a simplified form, generated on the basis of and indicative of the path of the virtual probe. The logical tunnel model may comprise list(s) of connected points indicating (recorded) positions of the virtual probe in the virtual tunnels based on the 3D input model. Coordinates of the first and second location, in some embodiments x, y, and z coordinates in Cartesian coordinate system, may thus be first stored and used to generate an entry in the logical tunnel model in block 460. The method may be repeated, whereby in the next round the second location is used as the initial (or current) first location and the virtual probe is relocated to a subsequent location based on blocks 430-450. In some embodiments, directions between consecutive locations of the virtual probe being relocated in the input model are determined. The directions may be defined in the logical tunnel model and/or included in visualization of the logical tunnel model.

Figure 5:
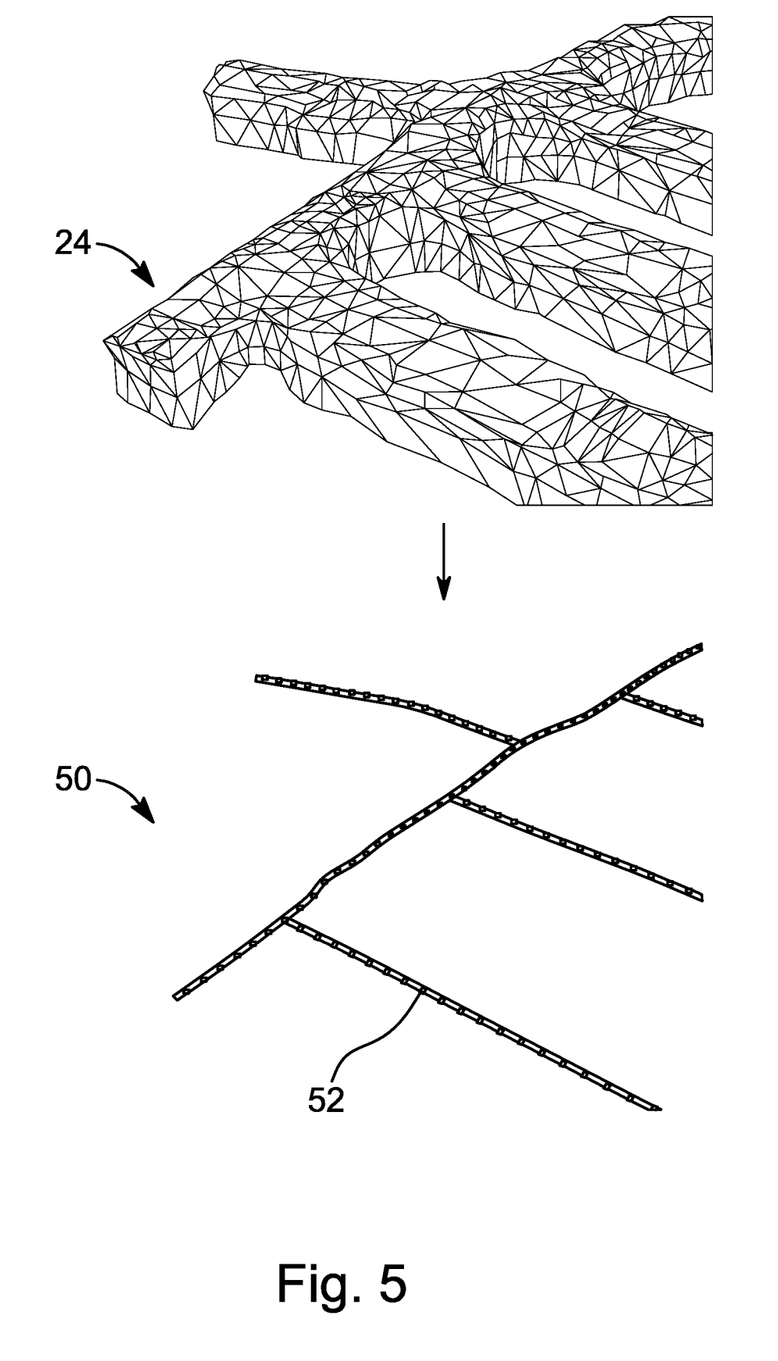
FIG. 5 illustrates an input 3D model and resulting logical tunnel model.

FIG. 5 illustrates a logical tunnel model 50 which may be generated based on the input 3D model 24 by applying the method of FIG. 4. The 3D mesh model 24 may be converted into a graph consisting of vertices and edges, where edges consist of paths of points 52 in 3D space. As the virtual probe 30 moves in the tunnel it may create a graph edge, which may comprise a path of points 52. A default distance between the points may be configurable, e.g. one meter. Thus, each time when the probe has travelled one meter, it may add its current position X, Y, Z as a path point to the current graph edge. The logical tunnel model may thus be a 3D model, but for some applications it may be sufficient to generate a 2D representation.

It will be appreciated that FIG. 4 illustrates some of the available features related to generating the logical tunnel model on the basis of the virtual probe travelling in the 3D input model, the and various additions and amendments may be applied, some further embodiments being illustrated below.

The method may comprise perform casting a set of rays 31 from the first or current location of the virtual probe 30 in multiple directions. The rays may be sent to different directions in the 3D space. However, the rays do not have to be cast in 360° range in a horizontal and/or vertical plane, but the rays may be cast in a limited angle in the horizontal and/or vertical plane.

For example, as illustrated in FIG. 3, there may be a set of rays towards forward or mapping direction of the virtual probe (i.e. away from the direction of already generated positions). These rays may be specific tunnel heading detection rays to perform blocks 430 and 440. The number and angular deviation of the rays should be configured to provide adequately accurate detection of at least the tunnel heading. The angular difference between tunnel heading rays may be selected in the range of 1-10°, such as 2-6°, and e.g. 3° has been detected to provide very good results.

In addition to having different horizontal plane (x, y) directions, such tunnel heading detection rays may have also different vertical plane (z) directions. There should be enough rays to ensure appropriate probe relocationing in case of ramps connecting different tunnel levels. For example, the vertical plane difference between rays may be selected in the range of 5-15°, and application of 10° difference has been detected to provide very good results.

It is to be noted that the planes may be adjusted in accordance with the applied coordinate system, for example in relation to the mobile device or worksite. A ray cast operation refers generally to a computational ray-surface intersection test.

A distance to a wall may be determined in block 430 on the basis of measuring distance to a ray intersection point, i.e. a point in which the ray hits a 3D face of the tunnel. The ray cast results in intersections, which may be x, y, and z coordinates in 3D space, on the basis of which the respective distances may be determined. The tunnel heading may be determined 440 on the basis of comparing the distances. Thus, ray direction providing the highest distance to the wall may be selected as the tunnel heading (or line). The orientation of the virtual probe may thus be changed towards the tunnel heading.

The virtual probe 30 may then be moved for a predetermined distance (in x, y, z directions) towards the tunnel heading and the resulting (x, y, z) position is selected as the new location of the probe. However, in an alternative embodiment also indicated above, the virtual probe is moved (with shorter steps) to the tunnel heading direction (may measure the distance also during movement). A new path point location is recorded for the logical tunnel model (as the second location in block 450) after achieving a preconfigured path point distance threshold.

In some embodiments the number of rays and/or a width of a fan (or the ray cast coverage area/beam) of a set of rays is dynamically adapted. The fan width may be narrowed by removing outermost rays in the set and enlarged by adding outmost rays, for example. Processing resources may be reduced by increasing the angle between cast rays (e.g. by removing every third ray from the set) in non-critical mapped areas.

Such dynamic adaptation may be particularly useful for the set of tunnel heading rays to optimize between system performance and required accuracy for differing tunnel properties. The dynamic adaptation may be applied on the basis of the current environment, in an embodiment based on one or preceding ray casting events. In an embodiment, the number of rays and/or the fan width is adapted dependent on length of one or more tunnel heading rays. For example, when the tunnel line is shortening, below a threshold value, the fan width may be enlarged to ensure appropriate detection of dead-end or T-crossing. For example, rays may be cast in directions −24, −18, −12, −6, 0 (tunnel heading), 6, 12, 18 ja 24 degrees, whereas in case of a long tunnel line the number of rays and the fan width may be reduced, even e.g. to 3 rays with directions −3, 0, and 3.

The method may be repeated until an end criterion is met, such as an end point of a tunnel is detected. In some embodiments, the below steps are performed:

Detect an end of a tunnel on the basis of processing determined distances to the walls from a (fourth) location of the virtual probe in the input model. There may be an additional check for end of tunnel after block 440. Thus, if an end of tunnel threshold condition or value is met, e.g. the longest ray is below a threshold value, an end of tunnel is detected.

Store an indicator of the end of the tunnel in the logical tunnel model in response to detecting the end of tunnel. This may be performed instead of block 440.

Relocate the virtual probe at a previously detected node location in the model, such as a tunnel branch, in response to detecting the end of the tunnel. Alternatively, the logical tunnel model generation is terminated in response to no unmapped tunnel branches remaining.

Thus, whenever the virtual probe 30 reaches a dead-end, it will finish the graph edge currently recorded.

The set of rays may comprise wall and/or branch detection rays. The wall detection rays may be cast on both sides of the virtual probe 30 to detect (shortest) distances to walls on both sides of the probe. The virtual probe 30 may be centered between the walls at a tunnel location on the basis of processing the determined distances. The locations determined for the logical tunnel model comprise positions of the virtual probe centered between the tunnel walls.

The set of ray casting operations may comprise one or more floor detection rays 33 to detect distance of the virtual probe 30 to a floor level or floor point of a tunnel. A floor detection ray may be configured to point directly downwards in the vertical plane direction (z) to detect the floor. It may be applied to position the virtual probe at a predetermined distance, such as 1 or 2 meters above the floor level. In addition to or alternatively to using floor detection ray(s), roof detection ray(s) may be applied.

The apparatus performing the method of FIG. 4 may be further configured to perform a tunnel branch detection procedure, which may comprise:

detecting a tunnel branch in response to determining two or more tunnel headings exceeding a branch threshold value at a (third) location of the virtual probe, and storing an indicator of the tunnel branch for the (third) location in the logical tunnel model.

The procedure may further comprise:

selecting a first tunnel heading among the determined two or more tunnel headings for surveying, and performing a set of virtual probe relocating events in the input model to store path of the virtual probe towards the selected first tunnel heading (wherein the tunnel heading may naturally be updated at each relocating event).

The virtual probe 30 may thus perform the relocating events until detecting an end of the tunnel in the tunnel branch from the selected first tunnel heading. The virtual probe may then be relocated to the tunnel branch (third) location after storing the path towards the first tunnel heading and map a second branch to a second tunnel heading. A tunnel or tunnel line/branch prospect or candidate list (or other type of record) may be maintained in a memory of the apparatus performing the present virtual probe operating procedure. Each prospect in the list has a starting point and direction.

After the end of tunnel detection, the virtual probe 30 is relocated or teleported to a starting point of a next unmapped prospect in the list, if any. As indicated above, the virtual probe may be controlled into particular direction (affecting the direction of the ray sets), whereby the virtual probe may be controlled to turn to detected tunnel heading direction of the prospect and start mapping the prospect. The tunnel line prospect is removed from the tunnel line prospect list. A new graph vertex may be created to the starting point of a new tunnel line, if there was not one already.

In the simple example of FIG. 3, four rays for branch detection point to the sides, two to the left and two to the right, which may be applied for detecting the walls and branching tunnels. If the length of these rays is below a branch detection threshold value, the virtual probe may turn away from the walls. If the length exceeds a branch detection threshold value, for example 8 meters, a tunnel branch is detected. The threshold value may be configurable.

Figure 6:
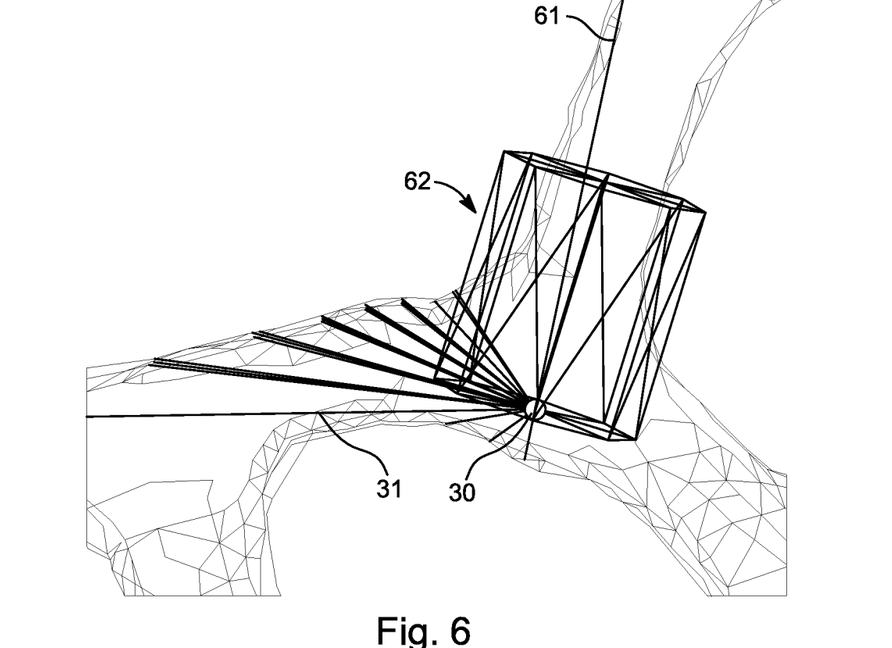
FIGS. 6 and 7 illustrate operations of the virtual probe.

FIG. 6 illustrates an example, in which the length of the wall detection ray 61 has exceeded a pre-configured branch detection threshold value (the limits being illustrated by element 62). The virtual probe 30 has thus detected a tunnel branch, so a tunnel line prospect towards the direction of the ray 61 may be defined.

Figure 7:
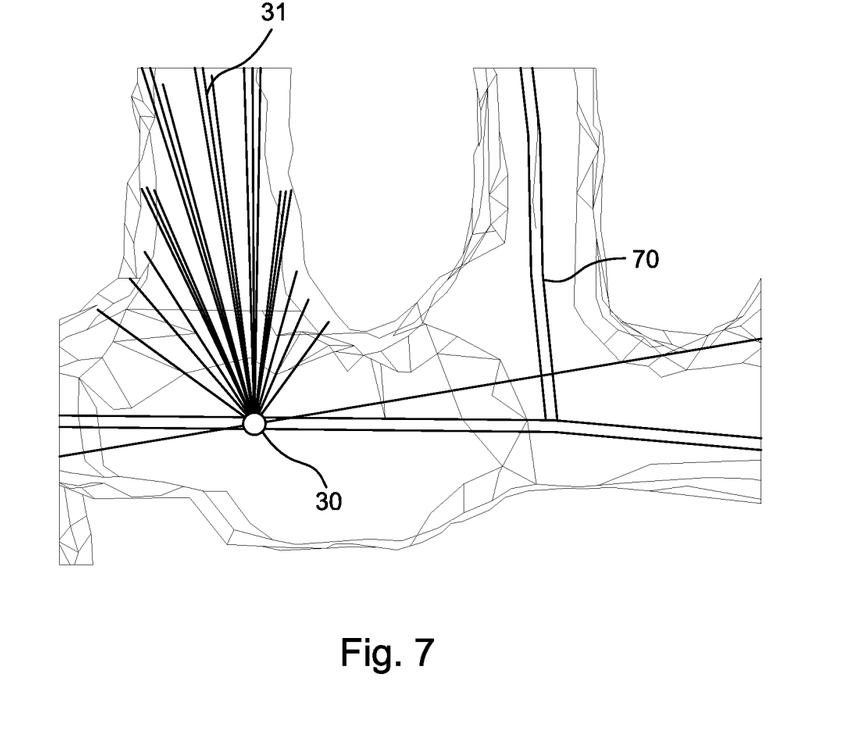

FIG. 7 illustrates a situation after the tunnel on the right side has been mapped and a path 70 generated for the logical tunnel model. The virtual probe 30 has detected a tunnel branch on the left side. The virtual probe is ready to start mapping this tunnel branch on the left side and a new edge and a new vertex may be added the logical tunnel model.

It is to be appreciated that on the basis of distance measurement or ray cast operations performed by the virtual probe, the apparatus performing the method of FIG. 4 may be configured to detect various other tunnel characteristics information for or to be identified in the logical tunnel model. For example, a passing bay location may be detected (on the basis of tunnel width) and indicated in the logical tunnel model. Another example is detection function for ramps, which are tunnels connecting the levels on different depths.

In some embodiments, the 3D input model comprises 3D point cloud data generated on the basis of scanning the tunnel. In block 430, a distance to tunnel wall (or roof or floor) at a ray cast direction may be determined on the basis of a set of closest/neighboring points. Simulating the intersection point may be performed by measuring distances to neighboring points at different points of a ray (i.e. at difference ray distances), e.g. every 10 cm. A threshold distance for registering a hit can be may be configured on the basis of density of the point cloud model. A hit, and thus an intersection point, may be registered at a ray point/distance when at least one point (multiple may be required) is closer than the threshold distance. For example, if the point cloud has 2 cm of maximum point density, 10 cm threshold distance has been detected to provide good results.

In some embodiments only a subset of the points of the 3D model is applied as an input data set for block 430. Hence, there may be an additional pre-processing or filtering step before block 430. For example, it may be adequate to use reduced resolution or amount of points, in which case the subset according to the adequate resolution may be uniformly selected for block 430, e.g. only a predetermined portion of the points of the 3D model are selected.

In another example embodiment, the model processing algorithm may be configured to detect and exclude certain portions of the 3D tunnel (input) model that are irrelevant for block blocks 440 and 450, for example on the basis of already determined locations of the virtual probe.

At least a part of the logical tunnel model and points thereof (being and/or based on the path locations of the virtual probe) may be applied for planning, monitoring, visualizing, and/or controlling operations in the tunnel system 2 of the worksite 1. Some examples are provided below.

The logical tunnel model may be applied for routing or navigating a mobile device, such as a mobile vehicle 4 or a mobile device carried out by a person 3. For example, the logical tunnel model may be thus stored in a database accessible by a positioning unit or application or a route planning unit or application of a worksite server or a mine vehicle to determine a route between a start point and an end point in the tunnel system. The most common routing algorithms require a mathematical graph consisting of vertices and edges. Underground tunnel system visualization, mobile device positioning and/or route generation is now enabled by using a substantially simpler model.

As a further example, the logical tunnel model is applied in tunnel safety or evacuation application or function configured to identify e.g. a closest exit or a shortest route out of for persons positioned in the model. Statistical information may be generated from the logical tunnel model, e.g. total tunnel length, number of tunnel intersections, average ramp gradient, etc.

In a still further example embodiment, the logical tunnel model is applied for a traffic management application. The traffic management application may be configured to guide or control mobile vehicles to their target positions based on route planning. The traffic management application may be configured to perform collision avoidance features, e.g. reserve routes and control a vehicle to wait or steer away in case of a higher-priority vehicle approaching.

The logical tunnel model can be converted into another type of 3D model. It is also to be noted that the 3D input model may be repetitively updated. For example a drill rig or a load&haul vehicle may be configured to scan their operating area in the tunnel at every round to update the tunnel model with the excavation progress. In some embodiments, the logical tunnel model is updated in response to detecting update of the 3D input model.

The control system 9 may comprise a server, which may comprise one or more above or underground computing units. The server may be configured to perform the method of FIG. 4 and provide the generated logical tunnel model as an input to further modules for controlling operations at the worksite 1, in some embodiments a position service module or a visualizer GUI module.

The system 9 or the server may comprise a task manager or management module, which is configured to manage at least some operations at the worksite by applying the logical tunnel model. For example, the task manager may be configured to assign work tasks for a fleet of vehicles and update and/or monitor task performance and status, which is indicated at a task management GUI.

The server may comprise a model processing module, which may maintain one or more models of the underground worksite, such as the 3D input model and the logical tunnel model. In some embodiments, the model processing module is configured to generate the logical tunnel model and store it to the database or storage of the system or the server.

The visualizer GUI module may be configured to generate at least some display views for an operator (locally and/or remotely). In some embodiments, the visualizer GUI module is configured to generate, on the basis of the (input) 3D model and/or the logical tunnel model, a 3D (and/or 2D) view indicating current position(s) of the mobile object(s) in the tunnel.

The server may comprise further module(s), such as a remote monitoring process and UI, and/or a cloud dispatcher component configured to provide selected worksite information, such as the logical tunnel model to a cloud service. The system and server may be connected to a further system and/or network, such a worksite management system, a cloud service, an intermediate communications network, such as the internet, etc. The system may further comprise or be connected to a further device or control unit, such as a handheld user unit, a vehicle unit, a worksite management device/system, a remote control and/or monitoring device/system, data analytics device/system, sensor system/device, etc.

An electronic device comprising electronic circuitries may be an apparatus for realizing at least some embodiments of the present invention, such as the main operations illustrated in connection with FIG. 4. The apparatus may be comprised in at least one computing device connected to or integrated into a control system which may be part of a worksite control or automation system.

Figure 8:
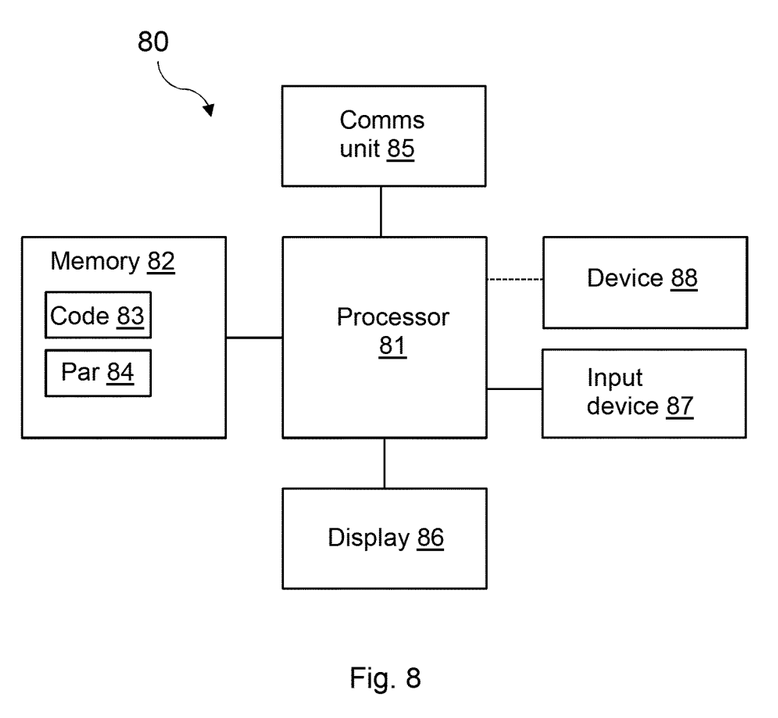
FIG. 8 illustrates an apparatus capable of supporting at least some embodiments.

FIG. 8 illustrates an example apparatus capable of supporting at least some embodiments of the present invention. Illustrated is a device 80, which may be configured to carry out at least some of the embodiments relating to the mobile object position tracking illustrated above. In some embodiments, the device 80 comprises or implements a server and/or the model processing module, e.g. in a control system 9 of a worksite.

Comprised in the device 80 is a processor 81, which may comprise, for example, a single- or multi-core processor. The processor 81 may comprise more than one processor. The processor may comprise at least one application-specific integrated circuit, ASIC. The processor may comprise at least one field-programmable gate array, FPGA. The processor may be configured, at least in part by computer instructions, to perform actions.

The device 80 may comprise memory 82. The memory may comprise random-access memory and/or permanent memory. The memory may be at least in part accessible to the processor 81. The memory may be at least in part comprised in the processor 81. The memory may be at least in part external to the device 80 but accessible to the device. The memory 82 may be means for storing information, such as parameters 84 affecting operations of the device. The parameter information in particular may comprise parameter information affecting e.g. the logical tunnel model generation and virtual probe operations application, such as threshold values.

The memory 82 may comprise computer program code 83 including computer instructions that the processor 81 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method steps in the device.

The device 80 may comprise a communications unit 85 comprising a transmitter and/or a receiver. The transmitter and the receiver may be configured to transmit and receive, respectively, information in accordance with at least one cellular or non-cellular standard. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, and/or Ethernet, for example.

The device 80 may comprise or be connected to a UI. The UI may comprise at least one of a display 86, a speaker, an input device 87 such as a keyboard, a joystick, a touchscreen, and/or a microphone. The UI may be configured to display views on the basis of the worksite model(s) and the mobile object position indicators. A user may operate the device and control at least some aspects of the presently disclosed features, such as the tunnel model visualization. In some embodiments, the user may control a vehicle 4-7 and/or the server via the UI, for example to change operation mode, change display views, modify parameters 84 in response to user authentication and adequate rights associated with the user, etc.

The device 80 may further comprise and/or be connected to further units, devices 88 and systems, such as one or more sensor devices 88 sensing environment of the device 80.

The processor 81, the memory 82, the communications unit 85 and the UI may be interconnected by electrical leads internal to the device 80 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising at least one processor and at least one memory including computer program code, the at least one memory and computer program code configured to, with the at least one processor, cause the apparatus to:
  receive a three-dimensional input model of an underground tunnel system of a worksite;
  determine an initial first location in the input model for a virtual probe comprising a software entity configured to analyse the three-dimensional input model;
  perform casting a set of rays from the first location of the virtual probe in multiple directions;
  determine distances between the first location and tunnel walls based on measuring for each ray a distance to a ray intersection point in the input model;
  determine a tunnel heading based on comparing the determined distances between the first location and the tunnel walls such that a ray direction providing a highest distance to a respective tunnel wall is selected as the tunnel heading;
  relocate the virtual probe at a second location in the input model along with the determined tunnel heading;
  detect a tunnel branch in response to determining two or more tunnel headings based on a length of a ray for branch detection exceeding a branch threshold value at a third location of the virtual probe;
  store an indicator of the tunnel branch for the third location in a logical tunnel model;
  detect an end of a tunnel based on processing determined distances to the tunnel walls from a fourth location of the virtual probe in the input model;

store an indicator of the end of the tunnel in the logical tunnel model;

relocate, in response to detecting the end of the tunnel, the virtual probe at a previously detected tunnel branch in the logical tunnel model;

generate a logical tunnel model indicative of a path of the virtual probe travelling in the input model based on determined locations of the virtual probe being relocated in the input model; and apply the logical tunnel model to determine, based on path locations of the virtual probe, a route between a start point and an end point for navigating a mine vehicle in the tunnel system of the worksite.

2. The apparatus of claim 1, wherein the apparatus comprises an obstacle detection function configured to relocate the virtual probe in a virtual tunnel based on the input model without collision to an obstacle defined in the input model.

3. The apparatus of claim 1, wherein the at least one memory and the computer program code are configured to, with the at least one processor, further cause the apparatus to:

select a first tunnel heading among the determined two or more tunnel headings for surveying; and perform a set of virtual probe relocating events in the input model to store path of the virtual probe towards the selected first tunnel heading.

4. The apparatus of claim 3, wherein the at least one memory and the computer program code are configured to, with the at least one processor, cause the apparatus to:

relocate the virtual probe at a fifth location in the input model along with a second tunnel heading among the determined two or more tunnel headings after storing the path towards the selected first tunnel heading; and perform a set of virtual probe relocating events to store path of the virtual probe towards the second tunnel heading.

5. The apparatus of claim 1, wherein the at least one memory and the computer program code are configured to, with the at least one processor, cause the apparatus to terminate the logical tunnel model generation in response to no unmapped tunnel branches remaining.

6. The apparatus of claim 1, wherein the virtual probe is centered at a tunnel location based on processing the determined distances, and the determined locations include positions of the virtual probe centered between tunnel walls.

7. The apparatus of claim 1, wherein the set of rays includes wall and/or branch detection rays, tunnel heading detection rays, and one or more floor detection rays to detect a distance of the virtual probe to a floor level or floor point of a tunnel.

8. The apparatus of claim 1, wherein the input model is a mesh model having vertices, edges and faces, and the logical tunnel model includes vertices connected by edges.

9. The apparatus of claim 1, wherein the input model includes three-dimensional point cloud data generated based on scanning a tunnel and the apparatus is configured to determine a distance to the tunnel wall at a ray cast direction based on a set of neighboring points.

10. The apparatus of claim 1, wherein the at least one memory and the computer program code are further configured to, with the at least one processor, cause the apparatus to apply the logical tunnel model to generate a visualization of a structure of the tunnel system for a user, or calculate statistical information of the tunnel system.

11. A computer-implemented method performed by an apparatus including at least one processor, and at least one memory including computer program code, the at least one memory and computer program code configured to, with the at least one processor, cause the apparatus to perform the method comprising:

receiving a three-dimensional input model of an underground tunnel system of a worksite;

determining an initial first location in the input model for a virtual probe comprising a software entity configured to analyse the three-dimensional input model;

performing casting a set of rays from the first location of the virtual probe in multiple directions;

determining distances between the first location and tunnel walls based on measuring for each ray a distance to a ray intersection point in the input model;

determining a tunnel heading based on comparing the determined distances between the first location and the tunnel walls such that a ray direction providing a highest distance to a respective tunnel wall is selected as the tunnel heading;

relocating the virtual probe at a second location in the input model along with the determined tunnel heading;

detecting a tunnel branch in response to determining two or more tunnel headings based on a length of a ray for branch detection exceeding a branch threshold value at a third location of the virtual probe;

storing an indicator of the tunnel branch for the third location in a logical tunnel model;

detecting an end of a tunnel based on processing determined distances to the tunnel walls from a fourth location of the virtual probe in the input model;

storing an indicator of the end of the tunnel in the logical tunnel model;

relocating, in response to detecting the end of the tunnel, the virtual probe at a previously detected tunnel branch in the logical tunnel model;

generating a logical tunnel model indicative of a path of the virtual probe travelling in the input model based on determined locations of the virtual probe being relocated in the input model; and applying the logical tunnel model to determine, based on path locations of the virtual probe, a route between a start point and an end point for navigating a mine vehicle in the tunnel system of the worksite.

12. The method of claim 11, further comprising terminating the logical tunnel model generation in response to no unmapped tunnel branches remaining.

13. A non-transitory computer readable medium comprising program code for, when executed in a data processing apparatus, causes a method in accordance with claim 11 to be performed.

* * * * *